United States Patent

[11] 3,548,918

| [72] | Inventors | Otmar Kleinhagauer;<br>Wolfgang Hladny; Peter Cerwenka,<br>Kapfenberg, Austria |
|---|---|---|
| [21] | Appl. No. | 786,957 |
| [22] | Filed | Dec. 26, 1968 |
| [45] | Patented | Dec. 22, 1970 |
| [73] | Assignee | Gebr. Bohler & Co.<br>Kapfenberg, Austria<br>a corporation |
| [32] | Priority | Dec. 27, 1967 |
| [33] | | Austria |
| [31] | | No. A11663/67 |

[54] ELECTRODE SUSPENSION MEANS
6 Claims, 2 Drawing Figs.

[52] U.S. Cl. .................................................. 164/252,
75/10; 13/14
[51] Int. Cl. ..................................................... B22d 27/02
[50] Field of Search ............................................ 164/252,
52, 48, 50; 13/14GB, 15/(All); 219/138, 139; 314/42,
134, 39

[56] References Cited
UNITED STATES PATENTS

| 587,138 | 7/1897 | Roberts ........................ | 13/23X |
| 575,826 | 1/1897 | Deuther ........................ | 13/14X |
| 628,373 | 7/1899 | Van Denbergh .............. | 13/14X |
| 1,675,742 | 7/1928 | Weckerle ....................... | 13/15 |
| 2,973,452 | 2/1961 | Garmy ........................... | 314/69 |
| 3,057,935 | 10/1962 | Garmy ........................... | 13/14 |
| 3,187,079 | 6/1965 | Pestel ............................ | 13/15 |
| 3,396,263 | 8/1968 | Even et al. .................... | 314/39X |

FOREIGN PATENTS

| 7,367 | 1/1913 | Great Britain ................ | 13/15 |

Primary Examiner—J. Spencer Overholser
Assistant Examiner—V. K. Rising
Attorney—Arthur O. Klein ABSTRACT: An installation for electrically remelting a metal electrode, in particular an electrode made of steel.

The installation comprises an electrode and an electrode shaft which are rigidly connected to each other such as, for example, by welding. Means are provided for supporting the electrode in a holder in pendulumlike fashion in a supporting installation, so that each electrode assumes a vertical position which corresponds substantially to the longitudinal axis of the mold.

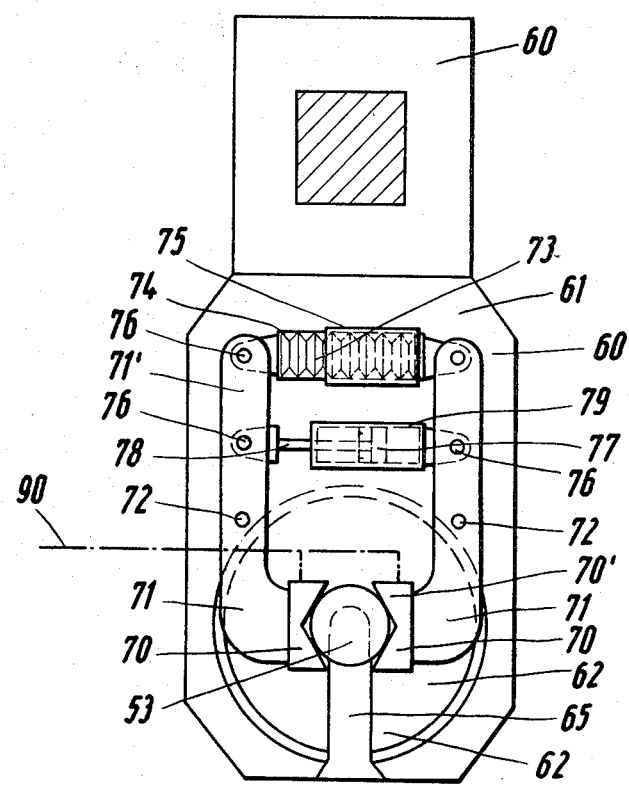

3,548,918

ELECTRODE SUSPENSION MEANS

BACKGROUND OF THE INVENTION

The present invention relates to installations for electrically remelting metals, and in particular a metal such as steel, by providing for use in the installation a primary electrode made up of the metal which is to be remelted. A mold receives the mold metal from the primary electrode to shape the mold metal into a body of a given configuration. The electrode is generally suspended from a shaft extending therefrom in an axial direction, such shaft having a substantially smaller diameter than the electrode itself and being rigidly connected thereto as, for example, by welding. After the electrode has been completely remelted, the shaft remains suspended and is held by an electrode holder. This shaft can be used again by welding it to a new electrode which then is again suspended inside the mold of the installation. It has been found that the joining of the shaft to the electrode by welding is quite difficult, in particular the aligning of the longitudinal axes of the shaft and the electrode can rarely be perfectly accomplished. Due to such misalignment the electrode can not be coaxially suspended in the mold and therefore the whole remelting operation sometimes malfunctions.

SUMMARY OF THE INVENTION

It is accordingly a primary object of the present invention to provide an installation which will avoid the above described drawback.

In addition, it is an object of the invention to provide an installation which makes it possible to always perfectly align the to be remelted electrode with the mold of the installation.

With the structure of the invention, an electrode holder is provided with an intermediate connecting piece from which the electrode is suspended. This intermediate connecting piece acts as a self-aligning pivot or swing bearing so that each electrode adjusts itself into a position in which its center of gravity is aligned with the vertical axis of the mold which passes through the pivot point of the intermediate connecting piece. In a preferred embodiment of the electrode holder there is provided an arm extending from the support column of the installation which supports the intermediate connecting piece. There is provided a spherical surface on the supporting arm as well as on the connecting piece which acts as a ball race and on which a plurality of balls are disposed. The connecting piece is furthermore provided with a longitudinal slit through which the supporting shaft of the electrode can be introduced, said support shaft having an enlarged endportion which serves for suspending the electrode from the connecting piece.

The connecting piece is furthermore provided with a pair of jaws which may be pneumatically or hydraulically actuated and which bear against the aforementioned enlarged endportion and also serve as conductors for the electrical current passing through the electrode.

BRIEF DESCRIPTION OF THE DRAWING

The invention is illustrated by way of example in the accompanying drawing which forms part of this application and in which:

FIG. 2 is a plan view of the installation illustrated in FIG. 1.

DESCRIPTION OF A PREFERRED EMBODIMENT

Figure 1:
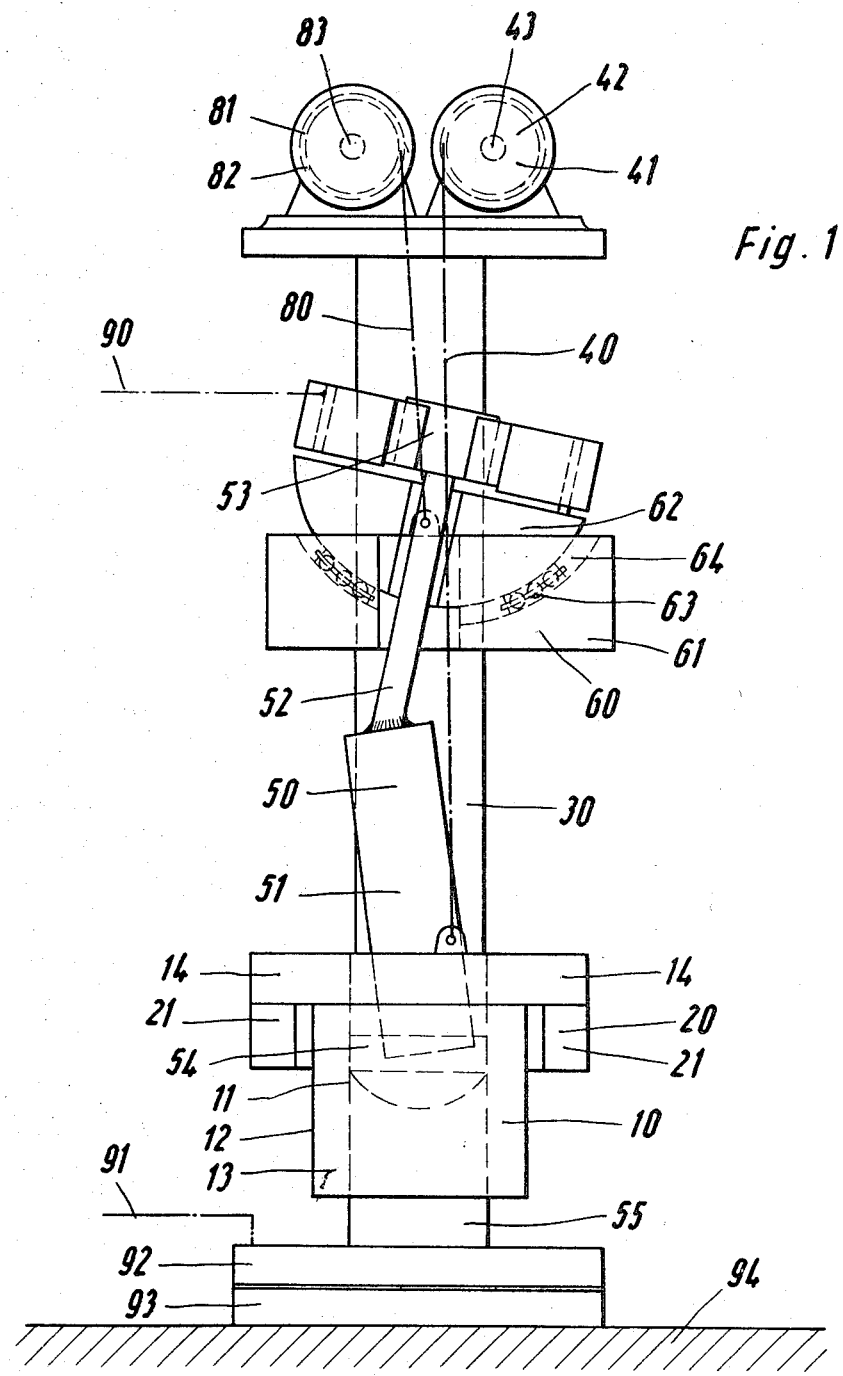
FIG. 1 is a schematic elevational view of the installation of this invention.

Referring now to the drawing, there is illustrated in FIG. 1 an installation for electrically remelting a metal electrode preferably consisting of steel. The installation comprises a mold 10 which has an interior cylindrical molding surface 11 and is provided with a flange portion 14 at its top, which is adapted to be engaged by a pair of fork arms of a mold lifting carriage 20. The mold lifting carriage 20 is slidably mounted on a column 30 of square cross section and is adjustably maintained in position by means of the cable 40 wound around the cable drum 41. The installation further comprises an electrode 50 consisting of a main electrode body 51 and a supporting shaft 52 which is suspended from the electrode holder 60. The electrode holder 60 comprises an arm portion 61 having a spherical surface and an intermediate piece 62 also having a spherical surface. A plurality of balls 63 are disposed between the aforementioned two spherical surfaces and are maintained in a correct position by means of a cage 64. The intermediate piece 62 is provided, at the side remote from the column 30, with a longitudinal slit 65. The supporting shaft 52 has at its upper end an enlarged portion 53. The shaft may be moved through the longitudinal slit 65 and is suspended in the connecting piece 62 by being supported therein by engagement of the enlarged portion 53 which bears against the upper surface of the connecting piece 62. A pair of clamping jaws 70 respectively mounted on levers 71 are adapted to engage the enlarged portion 53. The levers 71 are pivotally supported on the intermediate connecting piece 62 by a pair of bolts 72 which are parallel to the column 30. The clamping jaws 70 are respectively provided engaging surfaces 70' which are made to engage the cylindrical surfaces of the enlarged portion 53 due to the action of a spring 73 described herein below. The clamping jaws 70 also prevent that the supporting shaft 52 slides out of the longitudinal slit 65. The plate spring 73 comprises a first cylindrical shaft member 74 which extends into another cylindrical shaft member 75, both of which are pivotally supported on opposite levers 71', by means of bolts 76. The levers 71' are also connected to each other by means of a hydraulic piston-cylinder arrangement 79 which has a piston 77 having a piston rod 78 which is pivotally connected to one of the pair of levers 71', whereas the cylinder 79 is pivotally connected to the other one of the pair of levers 71'. The pivotal connections of the hydraulic piston-cylinder is effected by means of bolts 76; by means of this arrangement the clamping jaws 70 can be moved apart with the aid of the hydraulic piston-cylinder 79 against the action of the springs 73, thereby releasing the enlarged portion 53. The electrode holder 60 is also supported by means of a cable 80 which is wound on a cable drum 81. The elevation of the mold lifting carriage 20 and the mold 10 supported thereby, as well as the electrode holder 60 and the electrode 50 suspended therefrom, can be adjusted by means of the electric-gear motors 42 and 82 on the rotary shafts 43 and 83 of which the cable drums 41 and 81 are respectively mounted. The elevational adjustment of position of the electrode 50 and the mold 10 is such that, on the one hand, the electrode 50 is immersed in the slag layer 54 which floats on the molten metal (this layer serves for the cleaning and protection of the molten steel) and thus the end of the electrode 50 is maintained at the desired distance from the level of the molten metal and, on the other hand, the position of this level relative to the mold remains unchanged. The clamping jaws 70, which are preferably made of copper, serve also as electrical current conductors for the electrode 50 by having an electrical conducting line 90 (for example of the secondary winding of a transformer) connected thereto. The other pole of the electrical power source is connected to a supporting plate 92, also preferably made of copper, by means of an electrical conducting line 91. The supporting plate 92 supports the solidified steel ingots 55 which exits from the bottom of the mold 10. There is provided underneath the support plate 92 an electrical insulating plate 93 which rests on the ground 94.

It should also be noted that the mold 10 is watercooled by having water circulate in the space 13 disposed between the cylindrical interior wall 11 and the exterior wall 12. The conducting to and from the space 13 of the cooling water is effected by means of flexible hoses which have not been illustrated.

The mold lifting carriage 20 as well as the electrode holder 60 are provided at the surfaces at which they contact the column 30 with four rollers which have not been illustrated and which serve to facilitate their vertical movement along the column 30. The electrode holder 60 represents also a lift carriage similar to lift carriage for the mold 10.

Although in the aforedescribed embodiment there is disclosed a cylindrical mold it is to be understood that molds of other configurations may also be used in the connection with the installation of this invention, such as for example molds having a square or rectangular cross section.

When the to be molten electrode is particularly large and heavy, it is advantageous to support the mold lifting carriage and the electrode holder on two separate columns. The electrode holder can in such an embodiment be supported on a movable crane or similar arrangement by means of a cable, said crane being movable over rails in a horizontal direction. The molten down electrode, that is the nonconsumed portion thereof, can at all times be placed on the ground outside of the mold at a suitable location provided for this purpose. Furthermore, the new electrodes may be stored in a vertical position in another suitable area from where they can be conveniently moved onto the electrode holder and thus be eventually positioned within the mold.

The installation of this invention has the significant advantage when compared with the electrode holding installations of the prior art in that itself adjusts the electrode suspended in the installation into a position which approximates that of an axial position within the mold, that is when the pivot point of the connecting piece, which is pivotally mounted on the electrode holder coincides with the longitudinal axis of the mold. With the arrangement of this invention it is possible to avoid all kinds of malfunctioning which may occur due to the fact that the longitudinal axis of the to be melted down electrode and the longitudinal axis of the supporting shaft join each other at an angle.

It is to be understood that the invention is not limited to the form shown in any of the accompanying drawings and described herein, inasmuch as the invention as defined in the appended claims may be embodied in various forms and may be utilized in connection with various types of electrode holding installations.

We claim:
1. In an installation for electrically remelting electrodes, comprising in combination:
a vertical column;
electrode holding means slidably movably disposed on said column and adapted to support an electrode;
a mold lifting carriage slidably movably disposed on said column underneath said electrode holding means and adapted to support a mold for receiving molten metal from said electrode;
adjusting means operatively connected to said electrode holding means and said mold lifting carriage for adjusting their relative position on said carriage; and
said electrode holding means comprise a first member having a first spherical contacting surface and a second member having a second spherical contacting surface, said electrode being suspended from one of said two members and said first and second spherical contacting surfaces coacting to provide a pendulumlike suspension for said electrode.

2. In an installation for electrically remelting electrodes, the combination as set forth in claim 1, wherein there are disposed a plurality of balls between said first and second spherical contacting surfaces.

3. In an installation for electrically remelting electrodes, the combination as set forth in claim 2, wherein said electrode comprises an upwardly extending shaft having an enlarged portion at its upper end, said one member having a longitudinally extending slit and said shaft being adapted to be inserted through said slit and being suspended in said one member by retention of said enlarged portion thereby.

4. In an installation for electrically remelting electrodes, the combination as set forth in claim 3, including a pair of jaws pivotally mounted at opposite sides of said slit on said one member and being adapted to engage said enlarged portion and biasing means operatively connected to said pair of jaws for urging them into engagement with said enlarged portion.

5. In an installation for electrically remelting electrodes, the combination as set forth in claim 4, including pneumatic actuating means operatively connected to said pair of jaws for urging them apart in opposition to said biasing means.

6. In an installation for electrically remelting electrodes, the combination as set forth in claim 4, including hydraulic actuating means operatively connected to said pair of jaws for urging them apart in opposition to said biasing means.